United States Patent
Lowery et al.

(10) Patent No.: US 9,614,617 B2
(45) Date of Patent: Apr. 4, 2017

(54) MULTICHANNEL NONLINEARITY COMPENSATION IN AN OPTICAL COMMUNICATIONS LINK

(75) Inventors: Arthur James Lowery, Victoria (AU); Liang Bangyuan Du, Victoria (AU)

(73) Assignee: Ofidium Pty. Ltd., East Melbourne, Victoria (AU)

( * ) Notice: Subject to any disclaimer, the term of this patent is extended or adjusted under 35 U.S.C. 154(b) by 978 days.

(21) Appl. No.: 13/500,158

(22) PCT Filed: Oct. 6, 2010

(86) PCT No.: PCT/AU2010/001307
§ 371 (c)(1),
(2), (4) Date: Jun. 25, 2012

(87) PCT Pub. No.: WO2011/041832
PCT Pub. Date: Apr. 14, 2011

(65) Prior Publication Data
US 2012/0263461 A1     Oct. 18, 2012

(30) Foreign Application Priority Data

Oct. 7, 2009   (AU) ................................ 2009904867

(51) Int. Cl.
 *H04B 10/00* (2013.01)
 *H04B 10/2563* (2013.01)
 *H04B 10/2557* (2013.01)

(52) U.S. Cl.
CPC ..... *H04B 10/2563* (2013.01); *H04B 10/2557* (2013.01)

(58) Field of Classification Search
CPC ................ H04B 1/10; H04B 10/25073; H04B 10/25137; H04B 10/2557; H04B 10/2563;
(Continued)

(56) References Cited

U.S. PATENT DOCUMENTS 6,587,242 B1 * 7/2003 Shake ................ H04B 10/0775
  398/98
6,778,730 B2 * 8/2004 Hironishi ............. G02B 6/2861
  359/348

(Continued)

FOREIGN PATENT DOCUMENTS

AU    WO 2008092193 A1 *  8/2008  ......... H04B 10/5053
JP          2009/239555         10/2009
(Continued)

OTHER PUBLICATIONS

Ho et al., "Electronic compensation technique to mitigate nonlinear phase noise", J. Lightwave Technol., 2004, 22, 779-783.
(Continued)

*Primary Examiner* — Hibret Woldekidan
(74) *Attorney, Agent, or Firm* — Baker & Hostetler LLP

(57) ABSTRACT

An apparatus (104) mitigates cross-channel nonlinear distortion of an optical signal (138) carried on one of a plurality of wavelength channels (118) in a wavelength division multiplexed (WDM) transmission system (100). The apparatus includes a first optical receiver (126) which is arranged to detect a measure (134) of aggregate optical power of the plurality of wavelength channels. A nonlinear dispersion compensator includes means (144) for applying a phase modulation to the optical signal in proportion to the measure of aggregate optical power.

17 Claims, 3 Drawing Sheets

(58) Field of Classification Search
CPC .... H04B 10/505; H04B 10/508; H04B 10/2507;
H04B 10/616; H04B 10/697; H04B
10/6971; H04J 14/0221
USPC ..... 398/38, 79, 150, 158–161, 193, 194, 188,
398/25
See application file for complete search history.

(56) References Cited

U.S. PATENT DOCUMENTS

| | | | | |
|---|---|---|---|---|
| 7,362,977 | B2 * | 4/2008 | Moeller | H04B 10/2513 398/147 |
| 7,542,675 | B1 * | 6/2009 | Graves | H04Q 11/0005 398/45 |
| 8,107,826 | B2 * | 1/2012 | Armstrong | H04B 10/548 398/158 |
| 8,112,001 | B2 * | 2/2012 | Lowery | H04B 10/2543 398/158 |
| 9,236,951 | B2 * | 1/2016 | Lowery | H04B 10/697 |
| 2004/0062552 | A1 | 4/2004 | Moeller | |
| 2004/0197103 | A1 * | 10/2004 | Roberts | H04B 10/2543 398/159 |
| 2004/0208605 | A1 * | 10/2004 | Bakhshi | H04B 10/2513 398/147 |
| 2010/0046961 | A1 * | 2/2010 | Tanimura | H03F 3/08 398/159 |

FOREIGN PATENT DOCUMENTS

| | | | |
|---|---|---|---|
| WO | WO 2007/041799 | 4/2007 | |
| WO | WO 2008/074085 | 6/2008 | |
| WO | WO 2008092193 A1 * | 8/2008 | ............ H04B 10/00 |
| WO | WO 2011/041832 | 4/2011 | |

OTHER PUBLICATIONS

Killey et al., "Reduction of intrachannel nonlinear distortion in 10-gb/s-based WDM transmission over standard fiber", IEEE Photonics Technology Letters, Dec. 2000, 12(12), abstract.

Lowery, "Fiber nonlinearity pre and post compensation for long-haul optical links using OFDM", Opt. Express, 2007, 15(20), 21965-12970.

Mayrock et al., "Spectral efficiency limitation by fiber non-linearity in optical OFDM transmission systems", Proceedings of 14$^{th}$ Int. OFDM Workshop, Hamburg, Germany, Sep. 2009.

* cited by examiner

MULTICHANNEL NONLINEARITY COMPENSATION IN AN OPTICAL COMMUNICATIONS LINK

CROSS-REFERENCE TO RELATED APPLICATIONS

This application is the National Stage of International Application No. PCT/AU2010/001307, filed Oct. 6, 2010, which claims the benefit of Australian Application No. 2009904867, filed Oct. 7, 2009, the disclosures of which are incorporated herein by reference in their entireties.

FIELD OF THE INVENTION

The present invention relates generally to optical communications systems, and more particularly to methods and apparatus for compensation of cross-channel nonlinear distortion in wavelength division multiplexed (WDM) transmission systems.

BACKGROUND OF THE INVENTION

Modern optical communications systems include network nodes interconnected by optical waveguides, typically being single-mode optical fibre links. Within the network nodes, communications signals are converted between electrical formats, used for signal processing including regeneration and routing, and optical formats, used for transmission between nodes. The links between nodes include multiple concatenated optical components, typically including multiple optical fibre spans, each being some tens of kilometers in length, and corresponding optical amplifiers overcoming the attenuation experienced by optical signals during transmission through the fibre spans.

Signals transmitted through optical fibre links are affected by linear dispersion processes, such as chromatic dispersion and polarisation mode dispersion. Chromatic dispersion, in particular, may be compensated at any convenient point in a transmission system, and many existing installed optical fibre transmission links include dispersion compensating components, such as lengths of dispersion compensating fibre, installed at network nodes and/or amplifier locations. The technique of deploying inline dispersion compensation components within an optical transmission system is sometimes known as "dispersion management", and the resulting cumulative dispersion characteristic within the transmission links as a "dispersion map".

While dispersion management techniques can be very effective, they suffer from the disadvantage of a lack of flexibility. For example, a dispersion map that is effective for a particular wavelength channel within a specific transmission link may be less effective for channels transmitted at other wavelengths, and/or if all or part of the link is subsequently incorporated into a different optical transmission path. Accordingly, upgrading dispersion-managed links to carry larger numbers of wavelength division multiplexed (WDM) channels, or reconfiguring the optical network in which the link is installed, may require a redesign of the dispersion management strategy, and modification of dispersion compensation components within the link. Greater flexibility may be achieved through the use of electronic dispersion compensation methods, such as that described in U.S. patent application Ser. No. 12/089,571 (also published as International Publication No. WO 2007/041799), which discloses in particular an electronic dispersion compensation method which uses block coding of information, and frequency domain equalisation of the resulting received signal, in order to provide complete compensation of linear dispersion in the electrical domain. This approach may particularly conveniently be implemented using orthogonal frequency division multiplexing (OFDM) methods for the encoding and decoding of the electrical signals. Nonetheless, there are a significant number of existing installed transmission systems which employ fixed dispersion management.

In addition to linear processes, propagating optical signals may be subject to nonlinear effects. While the levels of optical nonlinearity existing in most practical transmission media, and in silica optical fibres in particular, are relatively low, it is generally desirable to transmit optical signals at high power levels in order to maintain sufficient signal-to-noise ratios over extended transmission distances. The use of high transmission powers increases the effect of optical nonlinearities, resulting in optical signal distortion which ultimately limits the received signal quality, and thus the maximum transmission distance achievable before the signal must be detected, recovered and regenerated. It is therefore desirable to mitigate the effects of nonlinear distortion, as well as the effects of linear processes such as dispersion, as far as possible. U.S. patent application Ser. No. 12/445,386 (also published as International Publication No. WO 2008/074085) discloses methods and apparatus for compensating the effects of optical nonlinearities, via electrical signal processing at the transmitting end (ie pre-compensation) and/or at the receiving end (ie post-compensation). This prior disclosure is generally directed to compensating so-called single channel effects, such as self phase modulation (SPM), which result from high transmission power levels in a particular channel causing nonlinear distortion to the channel itself. However, in WDM systems in which information is transmitted using a large number of different wavelength channels, the contribution of a single channel to the overall optical power is relatively small, and so-called cross-channel effects such as four wave mixing (FWM) and cross-phase modulation (XPM) may be significant.

It is believed that inline dispersion compensation, such as the dispersion management techniques employed in many existing optical transmission links, may increase the levels of nonlinear distortion. This increased distortion is caused by enhanced nonlinear mixing between WDM channel, eg due to XPM, because the "walk off" between WDM channels is reduced through the use of dispersion management. In particular, dispersion causes different WDM channels to propagate through the optical fibre at different speeds, whereby an "averaging" effect reduces the severity of nonlinear distortions, since no portion of the signal is continuously subjected to any particular peak in overall optical power. However, in the presence of inline dispersion compensation, or dispersion management, this benefit is somewhat reduced.

It is generally considered that cross-channel effects, such as XPM, cannot be effectively mitigated by electronic processing, since reversing the effects of nonlinear propagation requires equalisation based upon a complete representation of all of the channels transmitted within the fibre, and their propagation characteristics. On the other hand, as has been noted above, the use of optical compensation techniques generally limits the flexibility of the network, particularly in relation to performing upgrades and/or reconfiguration in a simple and cost-effective manner.

It is accordingly an object of the present invention to provide improvements in the compensation and/or mitigation of nonlinear distortions, and in particular cross-channel effects, in a manner which can be effectively and efficiently applied to existing transmission links, including those employing dispersion management strategies, while also being adaptable to support network upgrades and reconfiguration.

SUMMARY OF THE INVENTION

In one aspect, the present invention provides a method of mitigating cross-channel nonlinear distortion of an optical signal carried on one of a plurality of wavelength channels in a wavelength division multiplexed (WDM) transmission system, the method including the steps of:
 obtaining a measure of an aggregate optical power of the plurality of wavelength channels; and
 applying a phase modulation to the optical signal in proportion to said measure of aggregate optical power.

As noted above, it is generally believed that cross-channel distortion cannot be effectively mitigated by electronic processing, without full knowledge of all of the WDM channels transmitted through an optical link, and the relevant propagation characteristics. However, the present inventors have discovered that surprisingly effective mitigation of cross-channel nonlinear distortion can be achieved using a single measure of the aggregate optical power across all relevant wavelength channels. This is believed to be due to the effect of chromatic dispersion which, even in dispersion managed systems, causes a reduction in efficiency of cross-channel effects, such as XPM, with both modulation frequency and frequency spacing of the WDM channels. For example, it has been calculated that, for a WDM channel spacing of 50 GHz, only those components of the signal having a frequency less than 1 GHz may impose a substantial XPM penalty on adjacent channels. This bandwidth is expected to decrease further for more-distant WDM channels.

Mitigation of nonlinear distortion may be performed at a receiving end of an optical transmission link. Alternatively, or additionally, inline nonlinear distortion mitigation may be performed at one or more locations within an optical link or network, such as at amplifier locations or add/drop nodes.

Advantageously, therefore, a single measure of aggregate optical power may be used as the basis for mitigation of cross-channel nonlinear distortion. In preferred embodiments, a single photodiode may be used to detect the optical power in a plurality of WDM channels, however it may also be possible to obtain a suitable measure of aggregate optical power using multiple photodiodes, eg one per WDM channel, or a plurality covering a number of WDM bands.

In view of the foregoing discussion, it is preferable that the measure of aggregate optical power is a bandwidth-limited measure of the instantaneous optical power in the plurality of wavelength channels. As will be appreciated, the use of practical opto-electronic and electronic components will inherently result in a bandwidth-limited measurement of detected optical power. However, in preferred embodiments additional improvements may be achieved in the mitigation of cross-channel nonlinear distortion by adapting the measurement to the system and to the particular optical signal.

More particularly, the bandwidth of the measure of instantaneous optical power is preferably limited according to a low-pass characteristic. Advantageously, the low-pass characteristic has a bandwidth that is less than a bandwidth of the optical signal. More preferably, the low-pass characteristic is selected, or optimised, so as to maximise a level of compensation of cross-channel nonlinear distortion of the optical signal. In some embodiments, the use of adaptive digital and/or analogue filters advantageously enable optimisation of the filter characteristics dynamically, in order to facilitate flexible deployment and reconfiguration.

In preferred embodiments, utilising conventional single-mode fibre with corresponding nonlinear propagation characteristics, the applied phase modulation is a phase advance.

Furthermore, in preferred embodiments a constant of proportionality between the measure of aggregate optical power and the level of phase modulation is determined in accordance with a measure of effective nonlinear length of the WDM transmission system.

Advantageously, the plurality of wavelength channels consists of a band of channels selected from a larger number of transmitted WDM channels. In particular, the optical signal to which the compensation is applied may be located near the centre of the selected band of channels. As previously noted, the effect of cross-channel nonlinear distortion is significantly reduced for more distant wavelength channels, and accordingly it may be desirable to avoid the detection of channels that do not make a substantial contribution to distortion of the optical signal of interest. The band of wavelength channels is, for example, encompassed by at least a 100 GHz bandwidth, preferably at least a 200 GHz bandwidth, and more preferably at least a 300 GHz bandwidth.

In a multi-channel system, in which nonlinear distortion is to be mitigated in a plurality of optical signals, it may be beneficial to utilise a different compensation signal (ie measure of aggregate optical power) for each optical signal. For example, the optimum bandwidth characteristics of the measure of instantaneous optical power may be different for each optical signal. However, since this approach requires additional components and processing, there is a corresponding trade-off between maximising compensation across all optical signals, and cost/complexity. Advantageously, it has been found that effective mitigation of nonlinear distortion can be achieved without optimisation for each individual optical signal, and accordingly in some embodiments a single measure of aggregate optical power in the plurality of wavelength channels may be used for the application of phase modulation to multiple optical signals, for mitigation of cross-channel nonlinear distortion. Significantly, a range of trade-offs is therefore possible between cost/complexity and optimality of mitigation of nonlinear distortion.

In another aspect, the invention provides an apparatus for mitigating cross-channel nonlinear distortion of an optical signal carried on one of a plurality of wavelength channels in a wavelength division multiplexed (WDM) transmission system, the apparatus including:
 a first optical receiver arranged to detect a measure of aggregate optical power of the plurality of wavelength channels; and
 a nonlinear distortion compensator which includes means for applying a phase modulation to the optical signal in proportion to said measure of aggregate optical power.

In some embodiments, the nonlinear distortion compensator includes an optical phase modulator disposed in an optical transmission path of the optical signal, the phase modulator having a modulation control input that is driven by a signal derived from the output of the first optical receiver.

The apparatus may further include a second optical receiver arranged to detect the optical signal, advantageously to perform nonlinear distortion compensation at a receiving end of an optical transmission link. In such embodiments, the nonlinear distortion compensator may include an electronic phase modulator disposed in an electrical signal processing path of the received optical signal following detection by the second optical receiver, the phase modulator having a modulation control input that is driven by a signal derived from the output of the first optical receiver.

In some embodiments, the electronic phase modulator includes at least one analogue phase modulator arranged to apply a phase modulation to an electrical signal output from the second optical receiver in accordance with the modulation control input.

In alternative embodiments, the apparatus further includes at least one analogue-to-digital converter (ADC) arranged to convert an electrical signal output from the second optical receiver into a corresponding sequence of digital signal samples; and a digital signal processor configured to apply a phase modulation to the sequence of digital signal samples in accordance with the modulation control input. More particularly, the apparatus may include a further ADC arranged to convert the output of the first optical receiver into a corresponding sequence of digital control samples, and the digital signal processor may be configured to apply a phase modulation to the sequence of digital signal samples in accordance with the sequence of digital control samples.

The first optical receiver is preferably configured to limit the bandwidth of the measure of aggregate optical power, preferably according to a low-pass characteristic, and more preferably to a bandwidth that is less than a bandwidth of the optical signal, and which may be selected so as to maximise a level of compensation of cross-channel nonlinear distortion of the optical signal. While the first optical receiver will typically have an inherently limited bandwidth, the receiver may include a low-pass filter, and/or additional filtering of the output of the first optical receiver may be performed prior to applying a control signal to the phase modulator. In embodiments employing digital signal processing, digital filtering of the digital control samples may be performed. Advantageously, this enables highly flexible optimisation of the mitigation of cross-channel nonlinear distortion, for example via the use of adaptive digital filters and/or by reconfiguration of digital signal processing software.

Further benefits, advantages and preferred features of the method and apparatus of the present invention will become apparent in the following description of preferred embodiments, which should not be considered limiting of the invention as defined in any of the preceding statements, or in the claims appended hereto.

BRIEF DESCRIPTION OF THE DRAWINGS

Preferred embodiments of the invention are described with reference to the accompanying drawings, in which.

DETAILED DESCRIPTION OF PREFERRED EMBODIMENTS

Figure 1:
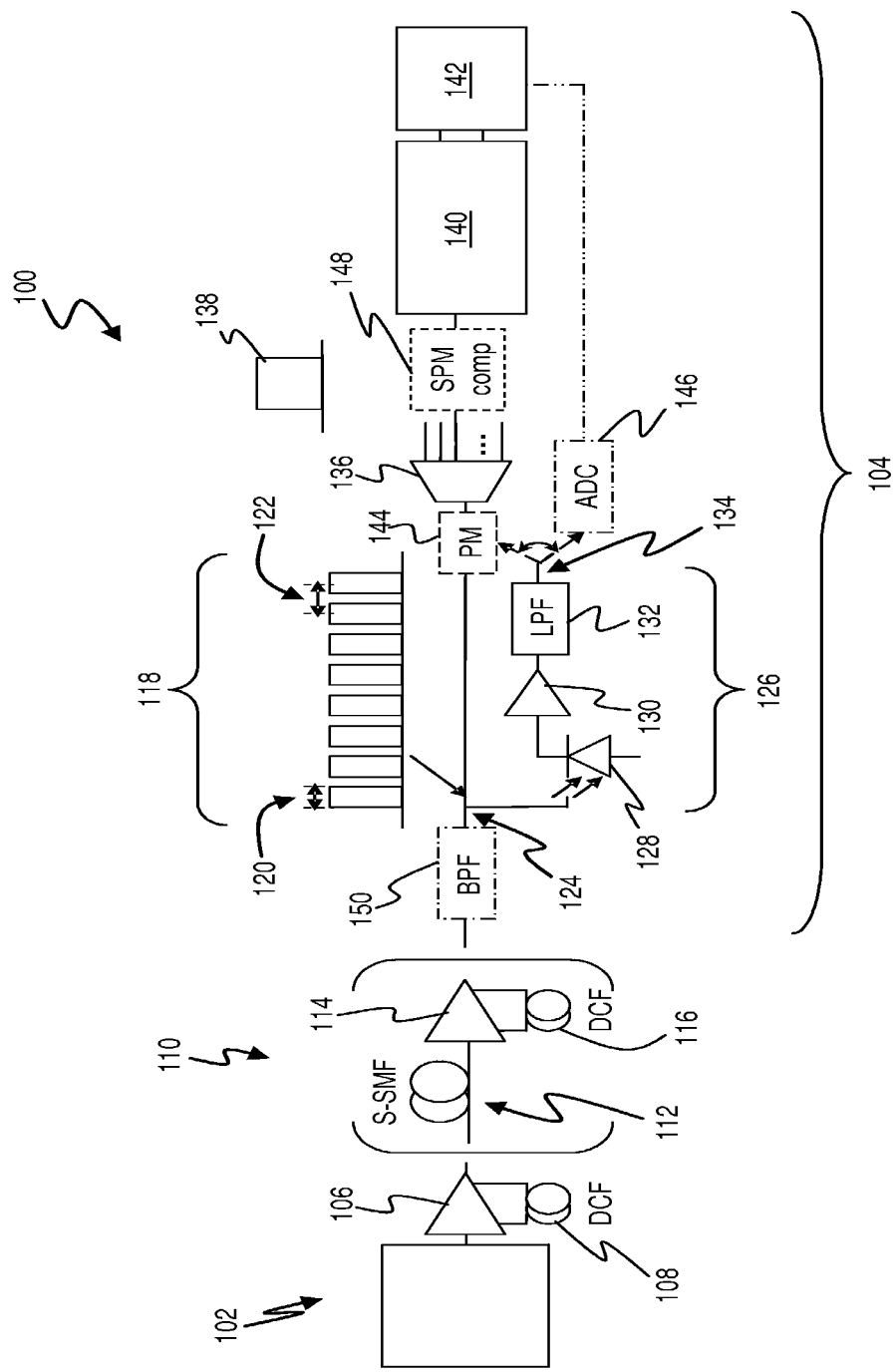
FIG. 1 illustrates schematically a system for transmitting signals over a nonlinear optical channel, including an apparatus for mitigating according to an embodiment of the invention.

FIG. 1 shows schematically a system 100 for transmitting signals over a nonlinear optical channel, according to embodiments of the present invention. The system 100 includes a transmitter 102, and a receiver apparatus 104 embodying the invention. The transmitter 102 and receiver apparatus 104 are interconnected via a dispersion-managed optical channel 110. At the transmitting end, there is provided a booster amplifier 106, which includes a length of dispersion compensating fibre (DCF) 108, for pre-compensating dispersion within the optical link 110. In accordance with a conventional design, the booster amplifier 106 is a multi-stage amplifier, such as a two-stage amplifier wherein the DCF 108 is disposed between the first and second stages. Such arrangements are well-known to persons skilled in the art of optical communications, and are therefore not described in detail herein.

The optical link 110 includes a plurality of spans, each of which includes a length of standard single-mode fibre (S-SMF) 112, for transmission of optical signals, and a multi-stage inline amplifier 114 including a corresponding length of DCF 116. In the examples described herein, each length of S-SMF 112 spans 95 km, and either 20 or 25 spans (ie totalling 1900 km or 2375 km) are used. However, it will be appreciated that these embodiments of the optical channel are exemplary only, and that the present invention is applicable to any optical system including a nonlinear optical channel for transmission of WDM signals.

For convenience, only a single transmitter 102 is illustrated in the system 100. However, the system 100 is generally a WDM system, and in the examples described herein eight wavelength channels are received by the receiving apparatus 104 having a received optical spectrum 118 that is depicted schematically in FIG. 1. Each of the eight optical channels has a bandwidth 120 (of 30 GHz in the examples described herein), and the channels are separated by a spacing 122 (of 50 GHz in the present examples).

At the receiving end, a proportion of the received optical signal power is extracted using an optical tap 124, and directed to a first optical receiver 126. The receiver 126 includes an optical detector, such as photodiode 128, connected to associated electronics including an amplifier 130, and thereafter to a low-pass filter 132, which serves to apply a bandwidth limitation to the received photocurrent or voltage waveform. The output 134 of the first receiver 126 is a control signal which is a measure of the aggregate optical power of the eight wavelength channels 118.

While the first optical receiver 126 is shown in FIG. 1 as being composed of three separate components, ie photodetector 128, amplifier 130, and low-pass filter 132, this is to some extent a schematic convenience, and in various embodiments different arrangements of components may be employed. For example, it will be appreciated that the photodetector 128 and amplifier 130 will each have an associated frequency response characteristic, which together with the characteristics of the low-pass filter 132 will determine the overall frequency response of the receiver 126. Accordingly, achieving a particular desired overall frequency response involves consideration of the design of the entire receiver 126, whereby in some embodiments the characteristics of the low-pass filter 132 may be incorporated, wholly or partially, into the design of the amplifier 130, and other associated electronics. Furthermore, in some preferred embodiments additional digital processing of the control signal 134 may be performed, and accordingly desired bandwidth and/or frequency response characteristics of the receiver 126 may be achieved, at least in part, through digital signal processing techniques. It should be understood that all such variations fall within the scope of the present invention.

Simultaneously with the detection of the aggregate optical power by the receiver 126, individual transmitted optical signals, such as that generated by transmitter 102, are separated from the WDM spectrum 118 by a WDM demultiplexer 136. One or more outputs of the WDM demultiplexer 136 are connected to corresponding optical receivers, and in particular a second optical receiver 140, arranged to detect the signal 138 transmitted by transmitter 102, is shown in the exemplary system 100. In accordance with the embodiment shown, the receiver 140 has a plurality of outputs that are connected to corresponding analogue to digital conversion and digital signal processing circuitry 142.

More particularly, in preferred embodiments of the invention, as depicted in FIG. 1, the transmission system 100 employs orthogonal frequency division multiplexing (OFDM) for encoding and modulating digital signal for transmission over an optical channel. By way of example, a coherent transmission system is assumed, wherein the optical OFDM signals are transmitted via the optical link 110 without an accompanying carrier. In order to maximise the available transmission capacity, signals may be transmitted on two orthogonal polarisation states of the optical field. Accordingly, the receiver 140 preferably includes a local oscillator (eg semiconductor or other laser source), an optical hybrid which separates both the orthogonal polarisation states and the in-phase and quadrature components of the transmitted coherent optical signal, along with corresponding pairs of balanced photodiodes for detection of received in-phase and quadrature components of the two polarisation-multiplexed signals. The receiver 140 therefore includes up to four electrical output ports. For simplicity, but without loss of generality, only a single polarisation channel is utilised in the particular examples described herein, and accordingly the receiver 140 has only two electrical output ports, which are directed to a digital conversion and processing block 142.

Further details of the generation and transmission of optical OFDM signals are disclosed in U.S. patent application Ser. No. 12/089,571 (also published as International Publication No. WO 2007/041799), the contents of which are hereby incorporated herein, in their entirety, by reference. This prior application also describes in detail the use of electronic digital signal processing techniques for the compensation of residual linear dispersion effects within the optical link 110. In preferred embodiments, dispersion equalisation is also performed in the digital processing block 142 of the system 100. However, the present invention is not limited to use with optical OFDM signals, and it is anticipated that it will be effective for the mitigation of cross-channel nonlinear distortion in systems employing other forms of optical modulation, such as those utilising coherent QPSK transmission.

The schematic illustration of the system 100 includes a number of optional and/or alternative components. In some embodiments of the invention, the control output 134 may be directed to an optical phase modulator 144, in order to apply a phase modulation to one or more of the received WDM signals that is proportional to the amplitude of the control signal 134. In alternative embodiments, the control signal output 134 is directed to an analogue-to-digital converter 146, wherein it is converted to digital form, and a corresponding sequence of digital control signal samples is directed to the digital signal processing block 142. Within the digital signal processor 142, a phase modulation is computed that is proportional to the digital control signal samples, and applied to the digital samples of the detected optical signal. In particular, in a system wherein the received optical signal (in-phase and quadrature components) is represented as a sequence of complex digital values, phase modulation may be implemented by converting the control signal samples received from the analogue-to-digital converter 146 into corresponding complex values having unit magnitude and a phase that is proportional to the magnitude of the control signal samples, and then multiplying the complex signal samples by the computed phase modulation values.

It should be noted that at least in embodiments of the invention employing an optical phase modulator 144, nonlinear compensation may be performed without detection and/or processing of individual optical signals. It will therefore be appreciated that while an embodiment 104 is presently described in which nonlinear compensation is performed at a receiving end of an optical transmission link, it is also possible to perform inline compensation at one or more points within an optical link or network, such as at amplifier locations or add/drop nodes.

Preferably, the receiving apparatus 104 also incorporates compensation for single-channel nonlinear effects, such as self-phase modulation (SPM). An SPM compensation block 148 is illustrated in the schematic diagram of FIG. 1, the operation of which may be in accordance with the principles described in U.S. patent application Ser. No. 12/445,386 (also published as International Publication No. WO 2008/074085). This prior application also describes the use of single-channel nonlinear pre-compensation, which may be implemented within the transmitter 102 according to preferred embodiments of the present invention.

The receiving apparatus 104 may further include an optical band-pass filter 150, which is arranged to select a band of WDM channels (such as the eight channels 118) from a larger number of WDM channels received via the optical link 110. More particularly, since cross-channel nonlinear distortion experienced by a particular transmitted optical signal is most strongly generated by those other WDM channels that are most closely located in frequency, it is desirable that the most influential WDM channels are included in the control signal generated by the first receiver 126, and that preferably more distant WDM channels are excluded. In WDM systems having a large number of wavelength channels, distributed over a wide range of optical wavelengths, it may be desirable to provide a plurality of receiving apparatus 104, each of which corresponds with a particular band of received channels, selected via a band-pass filter 150. In some arrangements, the band-pass filter 150 may be a coarse WDM demultiplexer, wherein a different band of WDM channels is directed to each one of a plurality of output ports. It may be desirable to provide an overlap between the ranges of wavelengths covered by each band, in order to maximise the extent to which cross-channel nonlinear distortion may be mitigated in each individual optical signal.

Furthermore, it may be desirable that the frequency response of the band-pass filter (or WDM demultiplexer) 150 include a gradual "roll off" at each edge of the frequency band, such that only a proportion of power in those channels most distantly spaced (in wavelength) from the received signal of interest is directed to the first receiver 126. In this way, the contribution of more-distant channels to the control signals produced at the output 134 of the receiver 126 may be commensurate with the contribution of those channels to cross-channel nonlinear distortion of the optical signal of interest. In the embodiment 100, the band-pass filter 150 is disposed prior to the optical tap 124, however in alternative embodiments it may be disposed between the optical tap 124 and the receiver 126, such that the transmitted WDM optical signals reaching the WDM demultiplexer 136 are unaffected by the characteristics of the band-pass filter 150.

Figure 2:
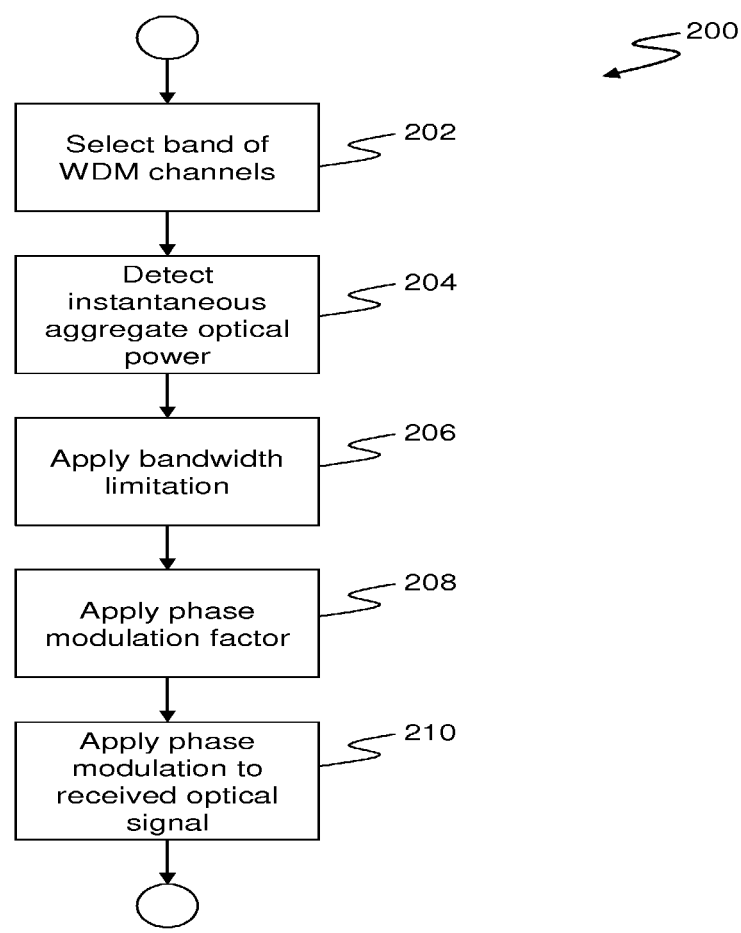
FIG. 2 is a flowchart illustrating a method of mitigating cross-channel nonlinear distortion of a received optical signal according to an embodiment of the invention.

Turning now to FIG. 2, there is shown a flowchart 200 which illustrates a method of mitigating cross-channel nonlinear distortion of a received optical signal according to preferred embodiments of the invention. The method, as shown in FIG. 2, is implemented by the receiving apparatus 104 of the system 100, as shown in FIG. 1. In particular, at step 202, a band of WDM channels is optionally selected, corresponding with the function of band-pass filter 150.

At step 204, instantaneous aggregate optical power within the band of WDM channels is detected, corresponding with the direction of the received WDM signal via optical tap 124 to the first receiver 126.

At step 206, a bandwidth limitation is applied to the detected signal. This step corresponds with the function of the low-pass filter 132 and/or appropriate digital signal processing performed by the processing block 142.

At step 208, the resulting control signal is scaled, eg by application of an appropriate "phase modulation factor", in order to produce a phase modulation signal (or corresponding sequence of digital control samples) that is proportional to the bandwidth-limited measure of aggregate optical power provided at the output 134 of the receiver 126. In an analogue implementation, eg utilising a phase modulator 144, the appropriate modulation factor may be applied through the use of suitable electrical gain and/or attenuation. This may be implemented either prior to, or following the low-pass filter 132, or may be incorporated within the low-pass filter 132 and/or electronic amplifier 130. In a digital implementation, the appropriate proportionality factor is readily implemented through numerical processing within the digital signal processing block 142.

Finally, at step 210, the relevant phase modulation is applied to the received optical signal, for example via the phase modulator 144, or through digital signal processing 142.

With regard to the bandwidth limitation 206, this is related to the effective bandwidth of the cross-channel nonlinear distortion of the received optical signal, which occurs during transmission through the optical link 110. In particular, chromatic dispersion within individual S-SMF spans 112, and DCF compensators 116, limits the range of frequency components of the received optical signal that are most severely affected by cross-channel nonlinear distortion. This is due to relative "walk off" of WDM channels within the optical frequency domain, whereby only relatively low frequency components remain phase matched for sufficiently long periods to contribute significantly to cross-channel nonlinear distortions. The maximum frequency components that are affected by cross-channel distortion decrease with increasing difference in optical frequency between contributing channels, and within increasing levels of chromatic dispersion. Thus an optimum bandwidth limitation depends upon the dispersion map of the optical link 110, and upon the spacing of the WDM channels within the optical frequency domain. An optimum filter bandwidth may be estimated by appropriate calculations, and/or through the use of experimental measurements or numerical simulations. By way of example, for a 50 GHz WDM channel grid, the most significant contributions to cross-channel nonlinear distortion occur below 1 GHz, and accordingly this provides a suitable estimate of the bandwidth of the low-pass filter 132 in an exemplary system utilising a 50 GHz channel spacing. Numerical simulations performed by the present inventors have demonstrated that the performance of the cross-channel nonlinear distortion mitigation method is not critically dependent upon achieving a precise optimised low-pass filter bandwidth. Rather, there exists a reasonable range of filter parameters for which near optimal results may be achieved. This enables a receiving apparatus 104 to perform effectively across a number of optical channels within a WDM band 118, and without requiring precise optimisation of the parameters of the low-pass filter 132. If desired, optimisation of the filter parameters may be performed adaptively within an operating system 100, by adjusting the filter bandwidth in order to maximise a measure of received signal quality. As will be appreciated, adaptive optimisation of the filter parameters may be readily achieved if the bandwidth limitation is performed wholly or partly in the digital domain.

With regard to the factor (ie proportionality) relating the control signal generated at the output 134 of the receiver 126 to the level of phase modulation applied to the received optical signal, in the case of transmission systems utilising S-SMF (eg 112), the appropriate modulation generally comprises a phase advance. The appropriate level of phase advance will generally depend upon the strength of the nonlinear interactions between the WDM channels within the optical link 110. This in turn depends upon the power levels launched into each span, the nonlinear properties of the optical fibres (ie S-SMF 112 and DCF 116) making up these spans, and the nonlinear effective length of the spans. The concept of nonlinear effective length is well-known in the art, and accounts for the effect of attenuation upon the overall nonlinear interactions. In particular, as signals propagate through a span of optical fibre they are attenuated, and accordingly the level of nonlinear interactions decreases. That is, nonlinear processes are more significant towards the input end of each span, where the optical power levels are greatest. Accordingly, the nonlinear effective length of a fibre span is generally somewhat less than the actual physical length of the span.

In practice, a rough estimate of the appropriate phase modulation factor may be obtained based upon the foregoing considerations of the properties of the optical link 110. The single resulting constant may then be adjusted, through a suitable optimisation process, within an operating system 100 in order to maximise a suitable measure of signal quality at the receiver 140, 142.

In general, therefore, the amount of bandwidth limitation (applied at step 206), is primarily dependent upon dispersion properties of the optical link 110, whereas the phase modulation factor (applied at step 208) is primarily dependent upon factors contributing to the strength of nonlinear interactions, eg fibre nonlinearity and attenuation, and optical launch power. These two parameters of the receiving apparatus 104 are accordingly relatively independent of one another, and may thus readily be optimised via independent optimisation processes. Furthermore, since each exhibits a single maximum in corresponding received signal quality within a readily identified range, an online optimisation process may readily be implemented.

In order to evaluate the effectiveness of embodiments of the invention, a number of computer simulations of transmission systems corresponding generally with the exemplary system 100 have been conducted. These simulations have been applied to model systems consisting of a plurality of optical fibre transmission spans, each of which is assumed, for simplicity, to be identical. The simulated systems include eight WDM channels, each of which carries a single 30 GHz bandwidth optical OFDM signal, with 1024 subcarriers modulated according to a 4-QAM scheme resulting in a raw data rate of 60 Gbit/s in a single polarisation. The WDM channel spacing is 50 GHz.

With regard to the optical dispersion map of the simulated systems, an initial chromatic dispersion pre-compensation is applied (ie via DCF 108) totalling 1530 ps/nm. Each span includes 95 km of S-SMF 112, followed by an amplifier 114 incorporating DCF 116 which is configured to undercompensate for dispersion in the S-SMF 112 by 85 ps/nm. The residual dispersion is compensated at the receiver. The double-stage amplifiers 106, 114 compensate for the loss of each span, and have noise figures of 5 dB. Amplifier gain is configured so that power output from each length of DCF 116 is the same as at the output of each length of S-SMF 112, so as to minimise nonlinear effects in the DCF 116.

In various simulations, results of which are described in greater detail below with reference to FIGS. 3 and 4, the total number of spans 110 is varied (being either 20 or 25 spans), and the power launched into each span is also varied, between −10 dBm and 0 dBm per channel.

Regarding the simulated receiving apparatus 104, the cross-channel nonlinearity compensator, consisting of first receiver 126 and phase modulator 144, is disposed prior to the demultiplexer 136, allowing simultaneous compensation of all eight WDM channels. As will be appreciated from the preceding description, with reference to FIGS. 1 and 2, it is not anticipated that this arrangement will generally result in optimum compensation of all eight WDM channels, however the simulation results demonstrate that cross-channel nonlinear distortion can be mitigated in a plurality of WDM channels using this technique, and performing simultaneous compensation of multiple WDM channels may advantageously reduce the complexity and/or cost of the receiving apparatus 104. In these simulations, numerical optimisation was performed in order to adapt the characteristics of the low-pass filter 132 to the fourth WDM channel (ie close to the centre of the band), by systematically varying the widths of the filter passband and transition band to find a maximum level of compensation for cross-channel nonlinear distortion.

The eight WDM channels are de-multiplexed via demultiplexer 136, individually compensated for SPM by SPM compensators 148, and detected using a coherent receiver 140. The 4-QAM modulated data is then recovered via digital processing 142 of the received signals, and the resulting electrical signal quality, Q, determined. In these particular examples, the signal quality Q is defined as the square of the mean distance of the 4-QAM symbols from a relevant axis of the complex plane, divided by the corresponding symbol variance. That is, Q is a measure of the likelihood (or rate) of detection error, wherein a higher value of Q represents a better quality signal. Significantly, there is a lower limit of the value of Q, slightly greater than 9 dB, above which error-free transmission may be achieved through the use of suitable forward error correction (FEC) algorithms. This value of Q thus constitutes a "FEC limit" for error-free transmission.

Figure 3:
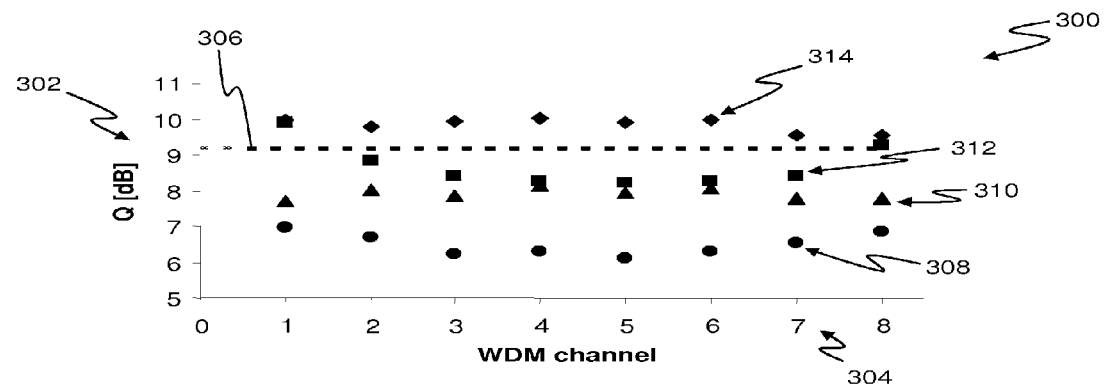
FIG. 3 is a graph illustrating received signal quality as a function of channel number in a WDM transmission system, including results achieved in accordance an embodiment of the invention.

FIG. 3 is a graph 300 showing average values of Q (on axis 302) for each of the eight WDM channels (on axis 304). The graph 300 also shows the FEC limit 306. The transmission system includes 20 spans, each of 95 km, for a total of 1900 km, with a launch power of −2 dBm per channel. The circles 308 represent received signal quality with no compensation. The triangles 310 represent received signal quality with cross-channel nonlinear distortion mitigation only. The squares 312 represent received signal quality with single channel (ie SPM) nonlinear distortion compensation only. The diamonds 314 represent received signal quality with both cross-channel and single channel nonlinear distortion mitigation. It is apparent that without nonlinear distortion mitigation, the central channels (eg channels 3 to 6) exhibit the poorest performance, due to strong cross-channel effects from the other channels. Mitigation for SPM of individual channels provides the greatest benefit to channels at the edge of the band, eg channels 1 and 8, since these are the least affected by cross-channel nonlinear distortion. Conversely, mitigation of cross-channel effects alone provides the most benefit to the central channels, eg channels 3 to 6. When both single-channel and cross-channel nonlinear distortion mitigation is performed, the resulting quality of all eight WDM channels is above the FEC limit.

Figure 4:
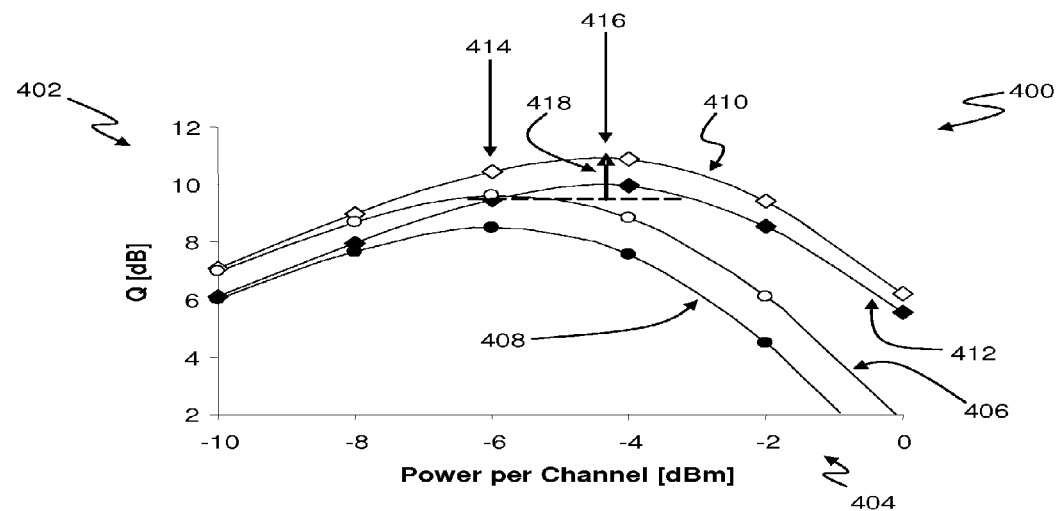
FIG. 4 is a graph illustrating received signal quality as a function of launch power per channel in a WDM transmission system, including results achieved in accordance with an embodiment of the invention.

Turning now to FIG. 4, there is shown a graph 400 in which signal quality (on axis 402) is plotted against launch power per channel (on axis 404). The curves 406, 408 represent systems in which no compensation for nonlinear distortion is applied. The curves 410, 412 present systems in which both single-channel and cross-channel nonlinear distortion mitigation are applied, in accordance with embodiments of the present invention. Furthermore, the curves 406, 410 represent systems including 20 transmission spans of 95 km each, for a total of 1900 km, whereas the curves 408, 412 represent systems including 25 spans of 95 km, for a total of 2375 km transmission. All four curves 406, 408, 410, 412 show the signal quality for the worst WDM channel in each case.

It is apparent from the results shown in the graph 400 that, for either transmission distance, the use of nonlinearity compensation, including cross-channel mitigation in accordance with an embodiment of the invention, enables the use of higher optimum launch powers per channel, with a corresponding increase in the minimum (ie worst case) received signal quality. In particular, without nonlinearity mitigation the optimum launch power is around −6 dBm (414), whereas with nonlinearity mitigation this is increased by almost 2 dB (416) and a 1.3 dB improvement (418) in worst-case received signal quality is achieved.

Furthermore, when nonlinearity mitigation is employed it is possible to exceed the FEC limit in all WDM channels, even over a distance of 2375 km in 25 dispersion-managed spans, whereas this is not possible over the same transmission link in the absence of nonlinearity compensation.

Additionally, by reference to the results shown in the graph 300 of FIG. 3, it is apparent that the worst-performing channels, represented by the curves 406, 408 in the graph 400, are channels located towards the centre of the WDM band when no compensation is applied. Significant improvements in the quality of these channels, sufficient to exceed the FEC limit, can only be achieved through the use of cross-channel nonlinear distortion mitigation in accordance with embodiments of the present invention. (By comparison, channels at the edge of the WDM band, eg channels 1 and 8, achieve a majority of total improvement in signal quality through SPM compensation alone.) It is accordingly apparent that only through the use of embodiments of the present invention can significant improvements in received signal quality be achieved across all channels in a WDM transmission system. In particular, in accordance with various embodiments disclosed herein, it is advantageously possible to achieve the required improvements using a relatively simple implementation in which a low bandwidth receiver 126 is used to obtain a single measure of aggregate optical power in a plurality of wavelength channels, which can then advantageously be used to mitigate the effects of cross-channel nonlinear distortions of received optical signals in one or more of the wavelength channels, either simultaneously or on a channel-by-channel basis.

A number of implementation options and variations have been described, and further modifications will be apparent to those skilled in the art. Accordingly, the invention is not to be limited to the particular embodiments described herein, but rather its scope is as defined by the claims appended hereto.

The invention claimed is:

1. A method of mitigating cross-channel nonlinear distortion of an optical signal carried on one of a plurality of wavelength channels in a wavelength division multiplexed (WDM) transmission system, the method including the steps of:
generating a control signal that is a bandwidth-limited measure of an instantaneous aggregate optical power of the plurality of wavelength channels;
demultiplexing an individual signal from the plurality of wavelength channels; and
applying a phase modulation to the individual signal in proportion to said control signal such that the effect of cross-channel non-linear distortion of the individual signal is mitigated.

2. The method of claim 1 wherein a bandwidth of the measure of instantaneous aggregate optical power is limited according to a low-pass characteristic having a bandwidth that is less than a bandwidth of the individual signal.

3. The method of claim 2 including a further step of selecting or optimising the low-pass characteristic so as to maximise a level of compensation of cross-channel nonlinear distortion of the individual signal.

4. The method of claim 1 wherein the applied phase modulation is a phase advance.

5. The method of claim 1 wherein a constant of proportionality between the control signal and the level of phase modulation is determined in accordance with a measure of effective nonlinear length of the WDM transmission system.

6. The method of claim 1 wherein the plurality of wavelength channels consists of a band of channels selected from a larger number of transmitted WDM channels.

7. The method of claim 1 wherein the individual signal is carried on a wavelength located within a central 50% of the optical bandwidth occupied by the plurality of wavelength channels.

8. The method of claim 1 wherein the phase modulation is separately applied to the individual signal and to one or more further signals carried on a corresponding one or more of the wavelength channels in the WDM transmission system.

9. An apparatus for mitigating cross-channel nonlinear distortion of an optical signal carried on one of a plurality of wavelength channels in a wavelength division multiplexed (WDM) transmission system, the apparatus including:
a first optical receiver arranged to detect the plurality of wavelength channels and to generate a control signal that is a bandwidth-limited measure of an instantaneous aggregate optical power of the plurality of wavelength channels;
a WDM demultiplexer configured to demultiplex an individual signal from the plurality of wavelength channels; and
a nonlinear distortion compensator that includes means for applying a phase modulation to the individual signal in proportion to the control signal such that the effect of cross-channel nonlinear distortion of the individual signal is mitigated.

10. The apparatus of claim 9 wherein the nonlinear distortion compensator includes an optical phase modulator disposed in an optical transmission path of the optical signal, the phase modulator having a modulation control input that is driven by the control signal.

11. The apparatus of claim 9 further including a second optical receiver arranged to detect the individual signal, and wherein the nonlinear distortion compensator includes an electronic phase modulator disposed in an electrical signal processing path of the received optical signal following detection by the second optical receiver, the phase modulator having a modulation control input that is driven by the control signal.

12. The apparatus of claim 11 wherein the electronic phase modulator includes at least one analogue phase modulator arranged to apply a phase modulation to an electrical signal output from the second optical receiver in accordance with the modulation control input.

13. The apparatus of claim 11 which further includes at least one analogue-to-digital converter (ADC) arranged to convert an electrical signal output from the second optical receiver into a corresponding sequence of digital signal samples; and
a digital signal processor configured to apply a phase modulation to the sequence of digital signal samples in accordance with the modulation control input.

14. The apparatus of claim 13 which includes a further ADC arranged to convert the output of the first optical receiver into a corresponding sequence of digital control samples, and wherein the digital signal processor is configured to apply a phase modulation to the sequence of digital signal samples in accordance with the sequence of digital control samples.

15. The apparatus of claim 9 wherein the first optical receiver is configured to limit the bandwidth of the measure of aggregate optical power, according to a low-pass characteristic.

16. The apparatus of claim 15 wherein the low-pass characteristic is selected so as to maximise a level of compensation of cross-channel nonlinear distortion of the individual.

17. The apparatus of claim 14 wherein the digital signal processor is further configured to perform digital filtering of the digital control samples having a low-pass characteristic selected so as to maximise a level of compensation of cross-channel nonlinear distortion of the optical signal.

* * * * *